M. LINTON.
LEVER MECHANISM FOR OPERATING THROTTLE VALVES.
APPLICATION FILED NOV. 22, 1916.
1,222,429.
Patented Apr. 10, 1917.
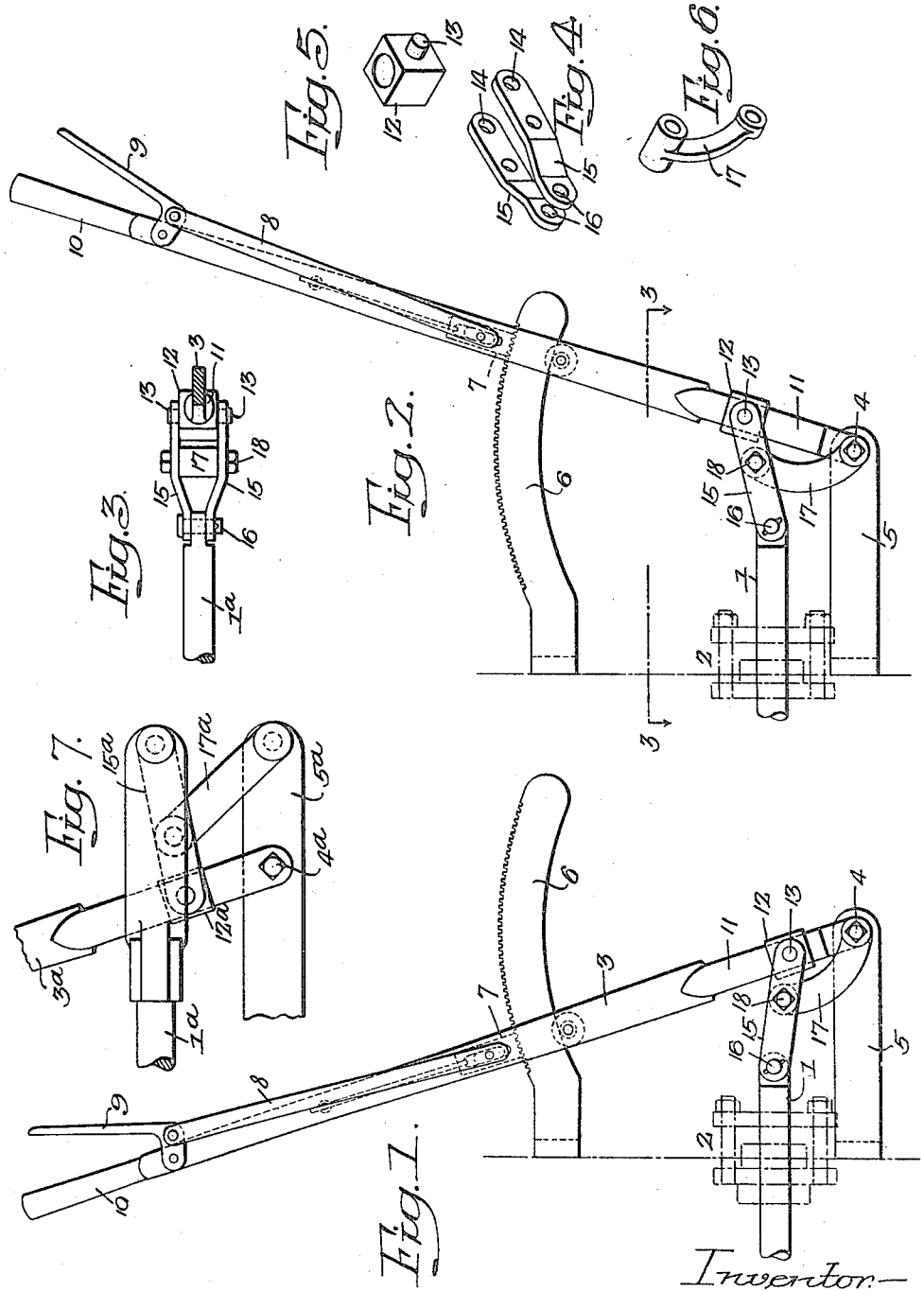

UNITED STATES PATENT OFFICE.

MORRIS LINTON, OF MOORESTOWN, NEW JERSEY, ASSIGNOR TO THE BALDWIN LOCOMOTIVE WORKS, OF PHILADELPHIA, PENNSYLVANIA, A CORPORATION OF PENNSYLVANIA.

LEVER MECHANISM FOR OPERATING THROTTLE-VALVES.

1,222,429.  Specification of Letters Patent.  Patented Apr. 10, 1917.

Application filed November 22, 1916. Serial No. 132,840.

*To all whom it may concern:*

Be it known that I, MORRIS LINTON, a citizen of the United States, and a resident of Moorestown, county of Burlington, State of New Jersey, have invented certain Improvements in Lever Mechanism for Operating Throttle-Valves, of which the following is a specification.

My invention relates to certain improvements in lever mechanism for operating throttle valves, particularly those of locomotives. In valve structures of this type it is difficult to lift the valve off its seat, especially valves of large size.

The object of my invention is to provide means by which the valve can be readily moved from its seat with comparatively little exertion and then can be rapidly moved to the full open position. This is accomplished by shifting the connection between the valve stem and the lever in respect to the fulcrum of the lever.

In the accompanying drawings:

Figures 1 and 2, are side views showing the lever and the valve stem in the two extreme positions;

Fig. 3, is a sectional plan view on the line 3—3, Fig. 2;

Fig. 4, is a perspective view of the link attached to the end of the valve stem;

Fig. 5, is a perspective view of the connecting block;

Fig. 6, is a perspective view of the bar connecting the fulcrum pin with the link; and Fig. 7, is a view of a modification.

Referring to the drawings, 1 is the stem of the throttle valve, passing through a stuffing box 2 of the ordinary type and connected to a throttle valve within the boiler. 3 is the operating lever connected by a pivot pin 4 to a bracket 5 projecting from the casing of the boiler. In the present instance this pivot pin 4 is the fixed fulcrum of the lever. 6 is a toothed segment, also projecting from the casing of the boiler. 7 is a toothed block adapted to the segment and connected by a link 8 to a lever 9 at the handle 10 of the throttle lever 3, so that the lever can be locked in any position to which it is adjusted.

The throttle lever has a rounded section 11, in the present instance near the fulcrum 4, and adapted to slide on this section is a block 12 shown in Fig. 5, having trunnions 13 adapted to openings 14 in the links 15 pivotally connected at 16 to the valve stem 1 so that any movement of the operating lever 3 will be imparted to the valve stem 1. Connecting the links 15 with the fulcrum 4 is a bar 17 shaped as shown in Fig. 6. This bar is connected by a pin 18 with the links at a point between the trunnions 13 and the pivots 16.

By this construction, when the operating lever is in the position illustrated in Fig. 1, the block 12 is nearest the fulcrum and, consequently, the valve can be readily lifted off its seat and, as it is preferably a balanced valve, it is immediately balanced and, as the operating lever is moved, the leverage is gradually decreased, but the movement of the valve rod is increased.

When the operating lever is in the position illustrated in Fig. 2, the valve is full open and the block 12 is farthest from the fulcrum 4.

In Fig. 7, I have illustrated a modification in which the valve stem $1^a$ is extended beyond the lever $3^a$ and the links $15^a$ are connected to the outer end of the extension of the valve rod and to the block $12^a$ which slides on the lever $3^a$. The bar $17^a$ in this case is pivoted to an extension $5^a$ beyond the fulcrum $4^a$ and operates in the same manner as the mechanism described in reference to Fig. 1.

Thus it will be seen that I provide means for shifting the connection between the valve rod and its operating lever without changing the position of the fulcrum. By this construction, I am enabled to move the valve off its seat without undue exertion and after it is once off its seat it can be moved quickly to the full open position.

By connecting the bar to the link at a point between the valve stem and the block, I am enabled to balance the strain on the valve stem and consequently prevent leakage at the stuffing box.

While I have described my invention as particularly adapted for use in operating throttle valves used in connection with locomotive boilers, it will be understood that the invention can be used for operating other valves without departing from the essential features of the invention.

While I have illustrated the section 11 of the throttle lever as round in cross section, it may be rectangular or otherwise shaped, without departing from the main features of the invention.

I claim:

1. The combination in means for operating a throttle valve, of a valve stem; a bracket; a lever pivoted to the bracket; a block slidably mounted on the lever; a link connecting the block with the valve stem; and a bar pivotally connected to the link between the valve stem and the block and mounted on the pivot forming the fulcrum of the lever.

2. The combination in means for operating a throttle valve, of a valve stem; an operating lever having a fixed fulcrum pin and having a rounded portion directly above the fulcrum; a block adapted to slide on the rounded portion of the lever and having trunnions; two links engaging the trunnions and pivotally connected to the valve rod; and a bar located between the two links and pivotally connected thereto and pivoted on the fulcrum pin on which the lever is mounted.

3. The combination in means for operating a throttle valve, of a valve stem; an operating lever having a fixed fulcrum; a block mounted to slide on the lever; a link connecting the block with the valve stem; and a bar connected to the link between the valve stem and the block and pivoted at a fixed point at or near the fulcrum.

MORRIS LINTON.

Copies of this patent may be obtained for five cents each, by addressing the "Commissioner of Patents, Washington, D. C."